UNITED STATES PATENT OFFICE.

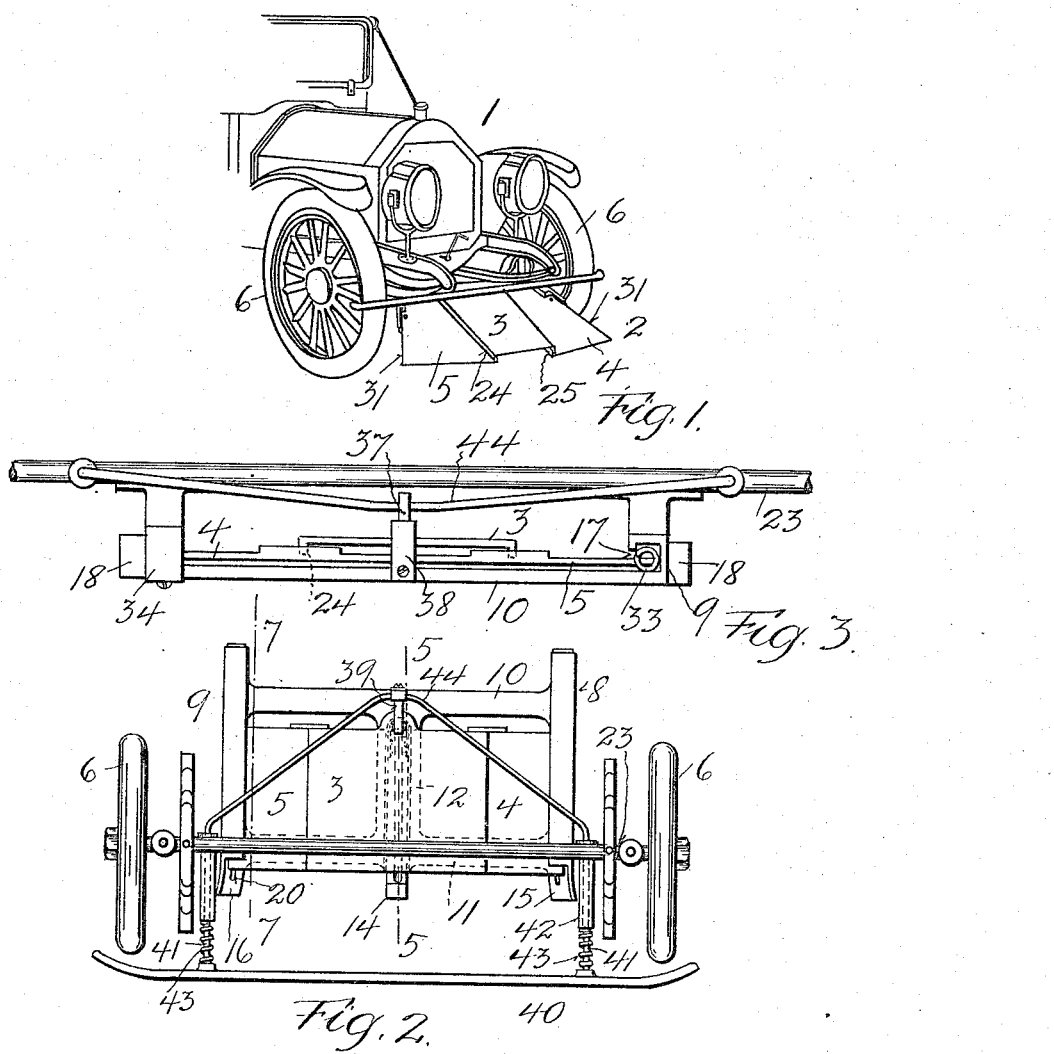

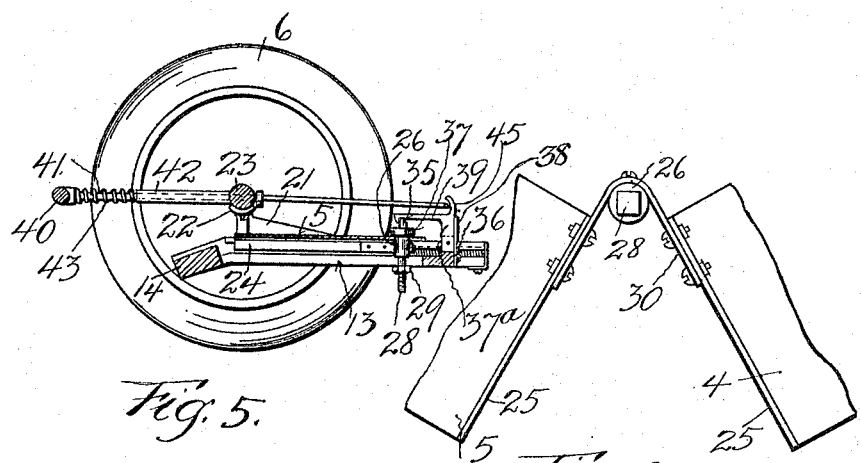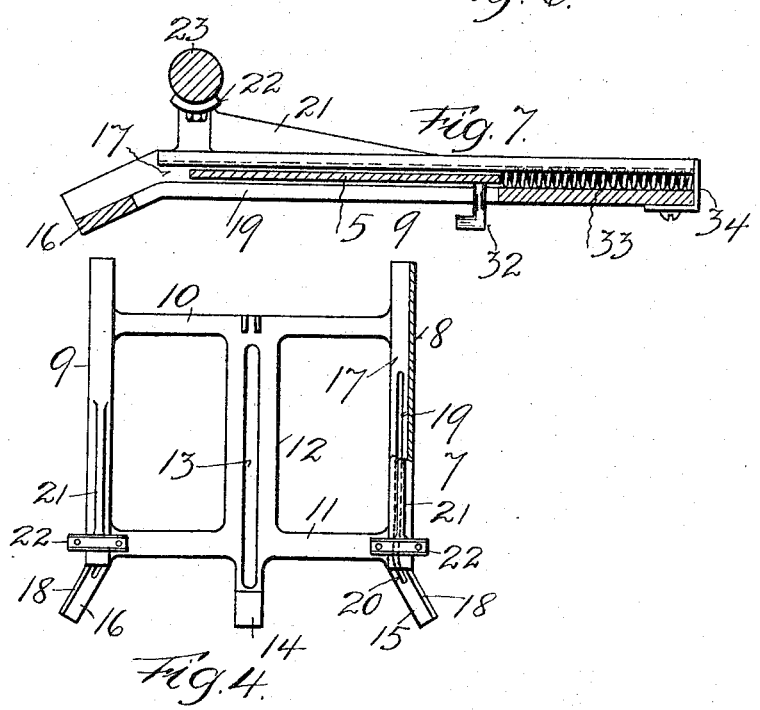

WALTER I. KOPPEL, OF NEW YORK, N. Y., ASSIGNOR OF ONE-HALF TO ABRAHAM KOPPEL, OF NEW YORK, N. Y.

FENDER.

1,186,663.  Specification of Letters Patent.  Patented June 13, 1916.

Application filed August 5, 1913. Serial No. 783,015.

*To all whom it may concern:*

Be it known that I, WALTER I. KOPPEL, a subject of the Emperor of Austria-Hungary, and a resident of the city of New York, county of Kings, and State of New York, have invented certain new and useful Improvements in Fenders, of which the following is a specification.

My invention relates to fenders or guards, and while not necessarily limited in its application to a particular class of vehicles, nevertheless it is especially intended to meet all the requirements of a fender for automobiles of various kinds.

The object of my invention is to provide a fender or guard for vehicles for the protection of persons or other bodies with which the vehicle is apt to come into contact, which shall be simple in construction and operation, which shall be compact, and which shall be carried in the most desirable manner. To this end I provide a fender which may be so mounted on the vehicle as to lie within the limits of the vehicle, more particularly under the forward portion of the vehicle or the engine casing, so as not to increase the lateral or longitudinal dimension of the vehicle, nor interfere with the operation of the vehicle, such for instance, as the cranking of the motor, and which will not detract in any manner from the general appearance of the vehicle. The device is so constructed and arranged that when some advanced portion of the vehicle, as for instance the bumper bar, comes into contact with a body the fender will be thereby released and will not only be advanced forwardly but will also be extended laterally so as to properly prevent the body from becoming entangled with the under structure of the car, or the wheels. By reason of the forwardly and laterally extending features it is possible to arrange the fender under the car where it will not be unsightly and where it will be entirely free of the mechanism of the car, including the wheels, springs, starting crank and other parts, and still be wide enough and extend forward sufficiently when opened to properly guard bodies from the wheels and various parts of the car. In the fullest embodiment of my invention the fender is not only projected forwardly and extended laterally, but it is also tipped or tilted downwardly at the front end. The purpose of this is to render the fender more effective when advanced and to make it possible to locate the fender in the most advantageous position when retracted.

Other features will be referred to in the detailed description following.

In the drawings forming a part of this application, Figure 1 is a perspective view, showing the forward end of an ordinary automobile, with my present invention applied thereto; and in this view the fender is shown extended, as when made operative by the striking of a body; Fig. 2 is a plan view, showing the forward wheels and axle of the automobile, with my improved fender attached, Fig. 3 is an end view, taken from the rear, and showing the fender and the axle, in which view the cap 34 on the right side has been removed to show the parts behind, Fig. 4 is a plan view, with parts broken away, showing the frame portion of the fender, Fig. 5 is a sectional view, taken on the line 5—5 of Fig. 2, Fig. 6 is a plan view showing the side plates of the fender and the means for spreading them, and, Fig. 7 is a sectional view showing the side plate and track construction.

In the drawings I have shown my invention applied to an automobile of ordinary construction. The front end 1 of such a vehicle is shown in Fig. 1 in perspective. In this view the fender is shown extended forwardly and laterally as when released by striking a body. In this view it will be seen that the fender 2 is composed of the several members 3, 4 and 5 the member 3 being arranged at the middle and the members 4, 5, on either side thereof, so that the fender extends across the full width of the car and in front of the wheels 6.

The fender is preferably constructed to be attached to the front axle of the vehicle, in the case of its application to an automobile. I have shown herein a frame 7 of rectangular shape, consisting of the side bars 8 and 9 connected by cross bars 10, 11; and a middle bar 12. The latter has a guide slot 13 extending substantially its length, in which the bolt or guide pin of the middle fender blade is guided. The forward end 14 of the bar 12 preferably extends beyond the cross bar 11 and extends downward on a slant corresponding with the angle of inclination to be given to the fender when in its forward position. The side bars 8, 9 are preferably similarly extended beyond the cross bar 11 at 15, 16 and they not only incline at about the same angle as the end 14, but they also diverge toward the wheels of the vehicle to which the device is attached. These side bars 8, 9 have slots or grooves 17 opening toward each other and extending the length of the parallel portions of the side bars. The walls which form the tops of these grooves do not extend along the projections 15, 16 and the latter are therefore L-shaped in cross section, the bottoms 15, 16 forming supports for the side plates of the fender and the upright webs 18, forming abutments for the edges of these plates. In addition to the slots 17 for guiding the side plates, the bottom walls of these grooves are each provided with a slot 19 in which the pins on the side plates travel. These slots preferably conform to the general direction of the bars 8, 9. That is the slots in both bars are parallel where the bars are parallel and they diverge at 20, where the bars diverge.

The frame 7 is shown as provided with upwardly extending webs 21 at each side, at the tops of which are plates or sockets 22 which fit and are secured to the front axle 23 of the vehicle. The frame is thus secured under the vehicle body or engine so as to lie horizontally and substantially within the wheel base as well as the wheel gage.

The fender proper consists of the blades 3, 4, 5 here shown as metal plates, though these members may be variously formed so long as they can be laterally extended when moved forwardly. The middle plate 3 has downward flanges 24 at its side edges, which engage upwardly extending flanges 25 on the inner edges of the side plates so that the plates will have an interlocking engagement when extended. The middle plate 3 has a sleeve 26 extending therethrough at the rear central portion and secured by the nut 37. This sleeve rests upon the bar 12; and a bolt 28 passing therethrough and provided with a nut 29 travels in and is limited in movement by the slot 13 in the bar 12. While in the position shown in Fig. 5 the plate 3 is supported by the sleeve 26 and the side plates, whereas when in its advanced position it is supported by the sleeve and by the projection 14 of the bar 12.

The side plates 4, 5 which underlie the middle plate more or less, are attached at their rear and opposed corners to a plate spring 30 which latter, in turn, is secured to the sleeve 26. The tendency of this spring is always to force the side plates laterally, thereby keeping them in their guiding grooves and also forcing them apart when they are projected to the divergent portions of the bars 8, 9.

The outer edges 31 of the side plates travel in the grooves 17, so that these plates are supported and guided by the side bars. The pins 32 on these side plates extend through the slots 19 in the bars 8, 9; and by means of these connections the side plates are limited in their horizontal movements. Within each groove 17 there is a spiral spring 33 abutting at one end against a removable cap 34 and at the other end against a side plate. These springs are under compression, so that they have always a tendency to force the side plates forwardly, and, through the connection between the side plates and middle plate, the latter as well.

The bolt 28 extends upward above the sleeve 26 sufficient to form an engaging member with which a spring latch may engage; and its top 35 is slanting for a purpose which will appear. To the bar 10 there is hinged at 36 a spring latch 37$^a$ which is held in the position shown in Fig. 5 by a spring 38 pressing against the rear thereof. This latch has an arm 39 extending forward and provided with an end which is shaped to engage with and hold the bolt 28.

In order to release the fender I provide means which will contact with a body coming into the path of the vehicle; and for this purpose I prefer to employ a bumper bar somewhat similar in position and arrangement to the bumper bars now in use. I have shown a bumper bar 40 extending across in front of the vehicle; and it is connected with laterally extending side bars 41, which pass through sleeves 42 secured to the axle 23 of the vehicle. Between the bumper 40 and the sleeves 42, and surrounding the bars 41 are coiled springs 43 which tend to keep the bumper bar in the forward position shown in the drawings. The bars 41 converge and unite at the rear 44, and engage with a projecting lip 45 on the spring latch.

Operation: When the fender is set for use the parts will have the position shown in Fig. 2. In this condition the latch engages the bolt 28 and thereby holds all blades of the fender in the rear or retracted position, with the springs 33 under compression. In this condition the device will not be unsightly. Nor will it interfere in any manner with the operation of the vehicle or the movements of its parts. It will not even interfere with the cranking of the engine. When the fender is in the retracted position the bar 44 will lie just in front of the lip 45 of the spring latch. If the vehicle accidentally strikes a person the bumper bar 40 will be forced backwardly by the contact of the body therewith, in opposition to the springs 43. The bar 44 will thereupon swing the latch and release it from the bolt 28 and thereupon the compressed springs 33 will force the fender plates forwardly As the plates go forwardly the middle one will be guided by the sleeve 26 and bolt 28; while the side plates will be guided in the grooves 17 in the side bars of the frame. As the plates approach their forward position, that is, when the side plates reach the diverging portions of their guides and the pins 32 the diverging portions of their slots, the spring 30 will force the side plates to extend laterally, fan shape, at their forward ends. The plates will stop when the bolt 28 and pins 32, reach the forward ends of their respective slots, at which time the fender will be in its advanced and laterally extended position, as shown in Fig. 1. As the plates advance over the ends 14, 15, 16 of the several bars, they are tipped downwardly by gravity, at their forward ends, until the several plates come to rest on the ends 14, 15, 16. In this advanced and extended position the fender will guard the vehicle and prevent the body from rolling underneath the vehicle and its wheels. If it is desired to return the fender to its rearward position it will only be necessary to force the plates back to their former position, whereupon the arm 39 of the latch will be raised by the slanting top of the bolt 28 until the latch engages in front of the bolt. The parts will then be in the position first described.

In describing the structure in detail I do not intend thereby to limit my invention to the particular embodiment herein shown. I believe I am the first to produce a fender which will be not only projected forwardly, but be extended laterally thereby making it possible to meet the requirements herein set forth.

Having described my invention, what I claim is—

1. In a device of the class described, a vehicle, a fender carried thereby, said fender comprising overlapping plates which are movable forwardly and extensible laterally, and means for operating the fender to project it forwardly and extend it laterally.

2. In a device of the class described, a vehicle, a fender carried thereby, said fender comprising overlapping plates which are movable forwardly and extensible laterally, and means for operating the fender to project it forwardly and simultaneously extend it laterally.

3. In a device of the class described, a vehicle, a fender carried thereby, said fender comprising overlapping plates movable forwardly, tiltable downwardly and extensible laterally, and means for operating the same.

4. In a device of the class described, a vehicle, a fender comprising overlapping plates mounted under the vehicle body and between the forward wheels thereof, said fender being movable forwardly and extensible laterally, and means for operating the fender.

5. In a device of the class described, a vehicle and a fender carried thereby, said fender comprising overlapping plates movable forwardly and extensible laterally to fan shape, and means for operating the fender.

6. In a device of the class described, a vehicle, a fender carried thereby, said fender comprising overlapping plates movable forwardly and extensible laterally, means tending to move the fender forwardly and extend it laterally, and means arranged to be engaged by an object in the path of the vehicle and adapted to initiate the operation of the fender.

7. In a device of the class described, a vehicle, and a fender carried thereby, said fender comprising overlapping plates movable forwardly and extensible laterally, means tending to move the fender forwardly and extend it laterally, a latch for holding the fender, and a bumper bar in front of the vehicle arranged to operate the said latch to release the fender.

8. In a device of the class described, a vehicle, a fender carried thereby, said fender comprising overlapping plates movable forwardly, means for supporting said fender in a substantially horizontal plane under the vehicle, and in an inclined plane when in an advanced position, and means for moving the fender forwardly.

9. In a device of the class described, a vehicle, a fender carried thereby, said fender comprising overlapping plates movable forwardly and extensible laterally, means for supporting said fender in a substantially horizontal plane under the vehicle, and in an inclined plane when in an advanced position, and means for moving the fender forwardly and extending it laterally.

10. In a device of the class described, a vehicle, a fender carried thereby, said fender comprising overlapping plates movable forwardly and extensible laterally, a spring for moving the fender forwardly, a spring for extending the fender laterally, means for holding the fender in its rearward folded position and means arranged to be operated by an object in the path of the vehicle for releasing said holding means.

11. In a device of the class described, a vehicle, and a fender carried thereby, comprising an intermediate guard plate and overlapping side guard plates on either side of said intermediate plate, tracks for said side guard plates, arranged substantially parallel at their rear portions and diverging at their forward portions, means for advancing the guard plates forwardly and for extending the side plates laterally as they reach the divergent portions of their tracks, and means for initiating the operation of said fender.

12. In a device of the class described, a vehicle and a fender carried thereby, comprising an intermediate guard plate, overlapping side guard plates foldable with relation to the intermediate plate, interlocking means for engaging the intermediate and side guard plates as the latter are extended laterally, tracks in which the outer edges of the side plates travel, said tracks diverging at their forward portions, and means for advancing said guard plates and laterally extending said side guard plates.

13. In a device of the class described, a vehicle and a fender carried thereby, comprising a supporting frame secured to the forward axle of the vehicle, said frame having substantially parallel grooved tracks having divergent and inclined forward portions and corresponding slots, and an intermediate slot, a fender proper comprising an intermediate plate having means guided in said last mentioned slot, side plates overlapping said intermediate plate and having their outer edges guided in the grooves of said track, springs in said grooves for moving the said plates forwardly, a spring connected with the rear portions of the side plates for extending said plates laterally, pins on the rear portions of the side plates guided in said first mentioned slots, means for holding the fender plates in the rearward position, and means for initiating the movement of said plates and arranged to be operated by contact with an object in the path of said vehicle.

Signed at the city, county and State of New York, this 29th day of July, 1913.

WALTER I. KOPPEL.

Witnesses:
HOWARD CAMPBELL,
E. B. DOLLARD.

Copies of this patent may be obtained for five cents each, by addressing the "Commissioner of Patents, Washington, D. C."